US012687663B2

(12) United States Patent
Roehrig et al.

(10) Patent No.: US 12,687,663 B2
(45) Date of Patent: Jul. 21, 2026

(54) LIGHT CONTROL FILM HAVING SECOND LOUVERS INCLINED WITH RESPECT TO FIRST LOUVERS

(71) Applicant: 3M INNOVATIVE PROPERTIES COMPANY, St. Paul, MN (US)

(72) Inventors: Mark A. Roehrig, Stillwater, MN (US); Zhaohui Yang, North Oaks, MN (US); Tri Dinh Pham, Woodbury, MN (US); Cynthia Y. Tamaki, Arden Hills, MN (US); Owen M. Anderson, Minneapolis, MN (US); Robert Bennett, Berkshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 1153 days.

(21) Appl. No.: 17/266,858

(22) PCT Filed: Aug. 8, 2019

(86) PCT No.: PCT/IB2019/056776
§ 371 (c)(1),
(2) Date: Feb. 8, 2021

(87) PCT Pub. No.: WO2020/031140
PCT Pub. Date: Feb. 13, 2020

(65) Prior Publication Data
US 2021/0294003 A1    Sep. 23, 2021

Related U.S. Application Data

(60) Provisional application No. 62/717,458, filed on Aug. 10, 2018.

(51) Int. Cl.
*G02B 5/00* (2006.01)
*G02B 5/04* (2006.01)
(Continued)

(52) U.S. Cl.
CPC ............. *G02B 5/003* (2013.01); *G02B 5/045* (2013.01); *G02B 5/201* (2013.01); *G02B 5/22* (2013.01);
(Continued)

(58) Field of Classification Search
CPC .......... G02B 5/003; G02B 5/201; G02B 5/22; G02B 5/223; G02B 2207/123;
(Continued)

(56) References Cited

U.S. PATENT DOCUMENTS 6,398,370 B1    6/2002   Chiu
8,213,082 B2    7/2012   Gaides
(Continued)

FOREIGN PATENT DOCUMENTS

JP    2003-066206    3/2003
JP    2009122187 A    6/2009
(Continued)

OTHER PUBLICATIONS

International Search Report for PCT International Application No. PCT/IB2019/056776, mailed on Apr. 30, 2020, 7 pages.

*Primary Examiner* — Ryan S Dunning
(74) *Attorney, Agent, or Firm* — Jonathan L. Tolstedt

(57) ABSTRACT

A light control film includes a first portion and a second portion laminated to the first portion. The first portion includes a first functional substrate and a plurality of first louvers formed on the first functional substrate. The first functional substrate includes at least one of an optically active layer and a barrier layer. The second portion includes a second functional substrate disposed distal to the first functional substrate and a plurality of second louvers formed on the second functional substrate. The second functional substrate includes at least one of an optically active layer and a barrier layer. The plurality of first louvers extend along a
(Continued)

first direction and the plurality of second louvers extend along a second direction. The first direction and the second direction are inclined to each other at an angle that lies within a range from about 70 degrees to about 110 degrees.

11 Claims, 6 Drawing Sheets

(51) Int. Cl.

| | |
|---|---|
| *G02B 5/20* | (2006.01) |
| *G02B 5/22* | (2006.01) |
| *G02B 17/00* | (2006.01) |
| *G02F 1/1335* | (2006.01) |

(52) U.S. Cl.
CPC ......... *G02B 17/002* (2013.01); *G02B 17/006* (2013.01); *G02F 1/133524* (2013.01); *G02B 5/223* (2013.01); *G02B 2207/123* (2013.01)

(58) Field of Classification Search
CPC .......... G02F 1/0063; G02F 1/29; G02F 1/291; G02F 1/133524; G02F 2201/08
See application file for complete search history.

(56) References Cited

U.S. PATENT DOCUMENTS

| | | | | |
|---|---|---|---|---|
| 8,503,122 | B2 | 8/2013 | Liu | |
| 8,523,108 | B2 * | 9/2013 | Coty ....................... | F16D 55/40 |
| | | | | 188/71.6 |
| 8,659,829 | B2 | 2/2014 | Walker, Jr. | |
| 9,229,253 | B2 | 1/2016 | Schwartz | |
| 2011/0216416 | A1 * | 9/2011 | Kashiwagi .............. | B32B 5/142 |
| | | | | 359/609 |
| 2013/0258483 | A1 | 10/2013 | Pett | |
| 2015/0109674 | A1 | 4/2015 | Cok | |
| 2016/0103250 | A1 | 4/2016 | Snyder et al. | |
| 2016/0231646 | A1 * | 8/2016 | Mino ....................... | G02B 6/08 |
| 2018/0074242 | A1 * | 3/2018 | Takahashi .............. | G02B 27/01 |
| 2018/0150671 | A1 | 5/2018 | Choo et al. | |
| 2021/0397041 | A1 * | 12/2021 | Kashiwagi ........ | G02F 1/133607 |

FOREIGN PATENT DOCUMENTS

| | | | | |
|---|---|---|---|---|
| JP | 2013-113902 | 6/2013 | | |
| JP | 2013-205698 | 10/2013 | | |
| JP | 2013205700 | 10/2013 | | |
| KR | 101086927 B1 | 11/2011 | | |
| TW | M476272 U | 4/2014 | | |
| WO | WO-2007118122 A2 * | 10/2007 | .......... | G02B 17/006 |
| WO | WO 2015-002685 | 1/2015 | | |
| WO | WO 2018-097842 | 5/2018 | | |

* cited by examiner

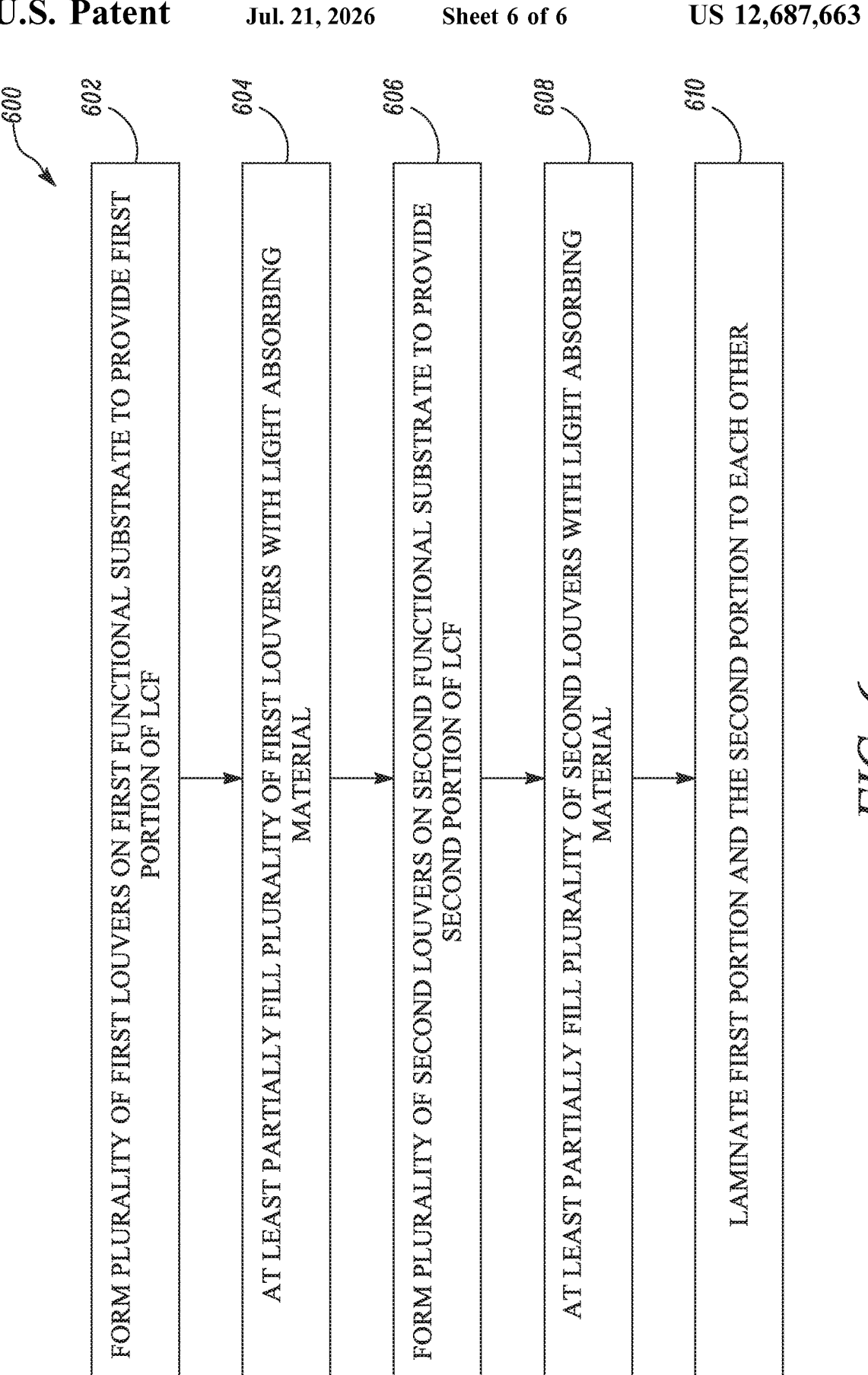

602 — FORM PLURALITY OF FIRST LOUVERS ON FIRST FUNCTIONAL SUBSTRATE TO PROVIDE FIRST PORTION OF LCF

604 — AT LEAST PARTIALLY FILL PLURALITY OF FIRST LOUVERS WITH LIGHT ABSORBING MATERIAL

606 — FORM PLURALITY OF SECOND LOUVERS ON SECOND FUNCTIONAL SUBSTRATE TO PROVIDE SECOND PORTION OF LCF

608 — AT LEAST PARTIALLY FILL PLURALITY OF SECOND LOUVERS WITH LIGHT ABSORBING MATERIAL

610 — LAMINATE FIRST PORTION AND THE SECOND PORTION TO EACH OTHER

LIGHT CONTROL FILM HAVING SECOND LOUVERS INCLINED WITH RESPECT TO FIRST LOUVERS

FIELD OF INVENTION

The present invention relates generally to light control films, and more specifically to light control films for use in various optical applications and methods of manufacturing such light control films.

BACKGROUND

Light control film (LCF), also known as light collimating film, is an optical film that is configured to regulate the directionality of transmitted light. Various LCFs are known, and typically include a light transmissive film having a plurality of grooves or louvers that are formed of a light absorbing material.

LCFs can be placed proximate a display surface, image surface, or other surface to be viewed. Typically, images being displayed can be viewed through the LCF only when the viewer is positioned within a range of angles referred to as the "viewing angle". Normally, the viewing angle is a range of angles centered on an axis normal to the surface or the plane of the LCF. As the position of the viewer changes such that the viewer is positioned outside the viewing angle, images being displayed are less or no longer viewable. This can provide privacy to a viewer by blocking observation by others that are outside a typical range of viewing angles.

LCFs can also be used for imaging applications which involve imaging or sensing an object. Imaging applications in mobile electronic devices, such as phones, require the LCFs to have low thickness due to the continuing drive to make these devices thinner. However, conventional LCFs that can be used in imaging applications have substantially high thickness due to the presence of multiple layers or films for performing various functions, such as angular as well as spectral filtering. Conventional LCFs can therefore be unsuitable for use in imaging applications where thickness of the LCF is an important requirement. It would therefore be desirable to have an LCF that has necessary functionalities and thickness for use in such imaging applications.

SUMMARY

Generally, the present invention relates to light control films. The present invention also relates to light control films for use with optical devices and methods of manufacturing such light control films.

In one embodiment of the present disclosure, a light control film includes a first portion and a second portion laminated to the first portion. The first portion includes a first functional substrate and a plurality of first louvers formed on the first functional substrate. The first functional substrate includes at least one of an optically active layer and a barrier layer. Further, each of the plurality of first louvers is at least partially filled with a light absorbing material. The second portion includes a second functional substrate disposed distal to the first functional substrate and a plurality of second louvers formed on the second functional substrate. The second functional substrate includes at least one of an optically active layer and a barrier layer. Further, each of the plurality of second louvers is at least partially filled with the light absorbing material. The plurality of first louvers extend along a first direction and the plurality of second louvers extend along a second direction. The first direction and the second direction are inclined to each other at an angle that lies within a range from about 70 degrees to about 110 degrees.

In some embodiments, the light control film has a viewing angle of less than about 40 degrees centered on an axis of peak transmission of the light control film. Further, the transmission of the light control film at an incidence angle greater than half of the viewing angle is substantially zero. In some embodiments, the light control film has a transmission at normal incidence greater than about 5% throughout all of a wavelength range from about 400 nm to about 700 nm.

In some embodiments, the first functional substrate is a multilayer optical film. In some embodiments, the second functional substrate is a gas barrier film.

In some embodiments, the first portion and the second portion are laminated to each other by a layer of an optically clear adhesive (OCA) disposed between the plurality of first louvers and the plurality of second louvers.

In some embodiments, each of the first plurality of louvers has a tapered shape. In some embodiments, each of the second plurality of louvers has a tapered shape.

In some embodiments, the light control film further includes a first land disposed between the plurality of first louvers and the first functional substrate. In some embodiments, the light control film further includes a second land disposed between the plurality of second louvers and the second functional substrate.

In some embodiments, an optical device using the light control film includes a cover lens and a display layer disposed adjacent to the cover lens. The light control film is disposed adjacent to the display layer.

In another embodiment, an optical device includes a display layer, a light control film disposed on the optical layer, and an optical sensor disposed adjacent to the light control film and disposed distal to the display layer. The light control film includes a plurality of first louvers and a plurality of second louvers. Each of the plurality of first louvers is at least partially filled with a light absorbing material. Further, each of the plurality of second louvers is at least partially filled with the light absorbing material. The plurality of first louvers extend along a first direction and the plurality of second louvers extend along a second direction. The first direction and the second direction are inclined to each other at an angle that lies within a range from about 70 degrees to about 110 degrees. Further, each of the plurality of first louvers has a tapered shape that tapers towards the optical sensor. Each of the plurality of second louvers has a tapered shape that tapers towards the optical sensor. In some embodiments, the optical devices further includes a cover lens disposed adjacent to the display layer and disposed distal to the light control film.

In another embodiment, a method of manufacturing a light control film includes forming a plurality of first louvers on a first functional substrate to provide a first portion of the light control film. The first functional substrate includes at least one of an optically active layer and a barrier layer. The method further includes at least partially filling the plurality of first louvers with a light absorbing material. The method further includes forming a plurality of second louvers on a second functional substrate to provide a second portion of the light control film. The second functional substrate includes at least one of an optically active layer and a barrier layer. The method further includes at least partially filling the plurality of second louvers with the light absorbing material. The method further includes laminating the first portion and the second portion to each other such that the second functional substrate is disposed distal to the first functional substrate. The plurality of first louvers extend along a first direction and the plurality of second louvers extend along a second direction. The first direction and the second direction are inclined to each other at an angle that lies in a range from about 70 degrees to about 110 degrees. In some embodiments, laminating the first portion and the second portion to each other further includes bonding the first portion to the second portion by an optically clear adhesive (OCA).

BRIEF DESCRIPTION OF THE DRAWINGS

The invention may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIG. 6 is a flowchart of an exemplary method of manufacturing a light control film.

DETAILED DESCRIPTION

Figure 1:
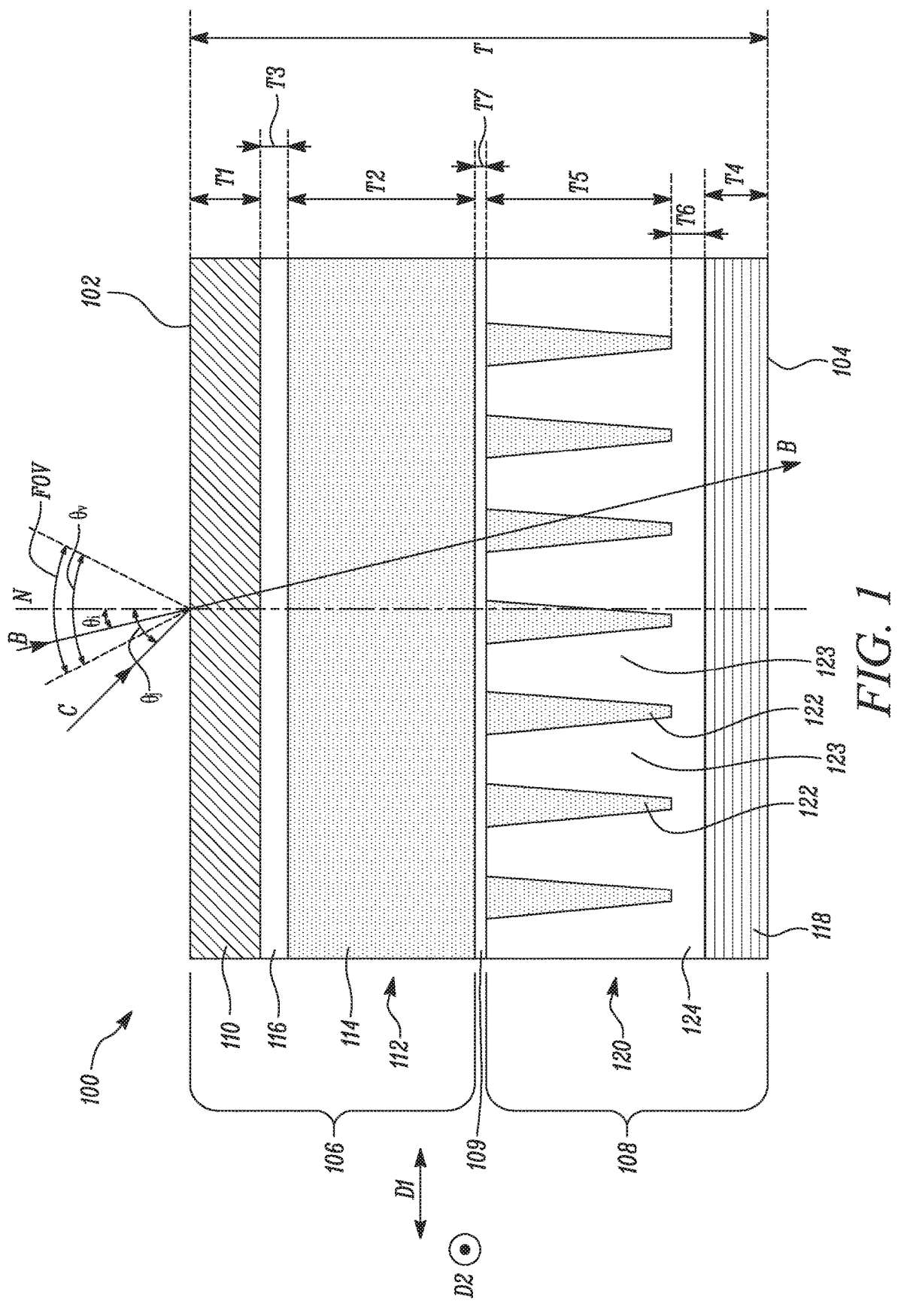
FIG. 1 is a schematic cross-sectional view of an exemplary light control film.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a light control film (LCF) that can perform angular filtering as well as spectral filtering of incident radiation. The LCF can be used in various optical applications, such as imaging applications, displays, and so forth. The LCF may provide a relatively small viewing angle to facilitate imaging or sensing of an object. The LCF further transmits certain wavelengths of incident radiation and blocks certain wavelengths. The LCF also reduces permeation of one or more fluids, such as water vapor and oxygen. The LCF includes one or more louver structures that are directly formed on functional substrates. This reduces a thickness of the LCF and makes it suitable for certain imaging applications, such as in mobile electronic devices (for example, mobile phones), where the thickness of the LCF is an important parameter. The present disclosure also relates to an optical device using the LCF and a method of manufacturing the LCF.

The "viewing angle" is defined herein with respect to the plane of peak transmission through the louver structure as the range of angles over which the louver structure is substantially transmissive. In some cases, the viewing angle is centered with respect to the normal of the plane of the louver structure. In some other cases, the viewing angle may not be centered at the normal of the plane of the louver structure, and may instead be off-center with respect to the normal. For example, the viewing angle of a light control film may be defined as the range of angles over which the transmission of the light control film is within 60%, or within 50%, or within 40% of a peak transmission. The louver structure of the present disclosure includes alternating transparent and light absorbing regions. The light absorbing regions are relatively positioned to provide a restricted viewing angle. Exemplary louver structures are described in U.S. Pat. No. 6,398,370 B1 (Chiu et al.), U.S. Pat. No. 8,213,082 B2 (Gaides et al.), U.S. Pat. No. 8,503, 122 B2 (Liu et al.), and U.S. Pat. No. 9,229,253 B2 (Schwartz et al.); all of which are incorporated herein by reference in their entirety.

The term "functional substrate", as used herein, refers to a film or a layer of an LCF that is optically active or reduces permeation of one or more substances. Specifically, the functional substrate includes at least one of an optically active layer and a barrier layer. Optically active layers selectively transmit and/or reflect incident radiation based on various parameters, such as wavelengths, incidence angle, and so forth. Barrier layers reduce permeation of one or more substances (for example, water vapor, oxygen etc.). Functional substrates are therefore distinct from conventional substrates or base layers (for example, Polyethylene terephthalate (PET) substrates) that are substantially transparent and do not reduce permeation of one or more substances.

Imaging or sensing using pixelated digital sensors typically involves detecting specific wavelengths of light ranging from ultraviolet, visible, near-infrared and infrared. Applications of such imaging techniques include, for example, consumer electronics, health monitoring, medical diagnostics, and automotive and security applications. An image quality of an object being sensed needs to be continually improved for certain applications, such as security.

Organic photo detector (OPD) materials may also be used in conjunction with digital imaging sensors. Such OPD materials may have a specific spectral response, and use only a part of wavelengths of incident radiation and reject certain wavelengths. Further, the use of pixelated digital sensors in mobile electronic devices, such as mobile phones, may pose additional challenges due to the continuing drive to make such electronic devices thinner. Due to thinness of such electronic devices, a distance between an imaging plane located at a top surface of a cover lens and a sensing plane associated with the imaging sensor may be low. Because of the proximity of the imaging plane to the sensing plane, additional angular filtering as well as spectral filtering of wavelengths may be required prior to being detected by the imaging sensor in order to enhance image quality.

LCFs may be used to provide angular filtering and spectral filtering for such imaging applications. However, LCFs may require a two-dimensional louver structure that passes only light within a critical view angle and blocks light at angles greater than the critical view angle. Tooling for a co-planar, two-dimensional louver structure may be difficult to manufacture at dimensions compatible with pixelated imaging sensors. The LCF, according to the present disclosure, may eliminate the need for such tooling by incorporating a two-dimensional louver structure that is formed by laminating two one-dimensional louver films together with an optically clear adhesive (OCA) so that the louvers are arranged at an angle with respect to each other. The resulting two-dimensional grid pattern may provide effective angular control required for imaging applications. The grid pattern may further be tailored to a variety of geometries compatible with the pixelated imaging sensor.

The pixelated image sensor may also be susceptible to moisture and oxygen that degrade the performance of the sensor over time. The LCF, according to the present disclosure, reduces permeation of water vapor and oxygen to the image sensor. Further, the LCF has a reduced thickness because the louver structures are directly formed on corresponding functional substrates and then laminated together. The reduced thickness makes the LCF suitable for use in mobile electronic devices, such as mobile phones. This is in contrast to conventional LCFs where the louvers are formed on separate substrate layers (for example, PET substrates) that increase the thickness of the conventional LCFs when used in mobile applications since additional layers of functional film would need to be added. Conventional LCFs also require additional adhesive layers which further contribute to the increased thickness.

FIG. 1 shows a schematic cross-sectional view of a light control film (LCF) 100. The LCF 100 includes a first major surface 102 and a second major surface 104 opposed to the first major surface 102. While the major surfaces 102 and 104 are referred to as the respective first surface and the second surface for reference purposes, it will be recognized that in use, the first surface may be facing a viewer, or a light source, or an object to be imaged; and the second surface may be facing a viewer, or a light source, or an object to be imaged. In some embodiments, the first major surface 102 is a light input surface and the second major surface 104 is a light output surface. The LCF 100 further defines a normal axis "N" that extends from the first major surface 102 to the second major surface 104. The normal axis "N" is normal to a plane of the LCF 100.

The LCF 100 further includes a first portion 106 and a second portion 108 laminated to the first portion 106. In the exemplary embodiment shown in FIG. 1, the first portion 106 and the second portion 108 are laminated to each other by an adhesive layer 109 of an optically clear adhesive (OCA). The OCA may be an ultraviolet (UV) curable acrylate adhesive, a transfer adhesive, or the like. Exemplary laminating methods are described in U.S. Pat. No. 6,398,370 B1 (Chiu et al.). The first portion 106 defines the first major surface 102. Further, the first portion 106 includes a first functional substrate 110 and a first louver structure 112 formed on the first functional substrate 110.

The first functional substrate 110 includes at least one of an optically active layer and a barrier layer. In some embodiments, the first functional substrate 110 is a multilayer optical film (MOF). A transmission and/or a reflection of the MOF may change with a wavelength of incident radiation. In some cases, the MOF is an Ultra-Clear Solar Film (UCSF), manufactured by 3M Company. The UCSF is a multilayer film that reflects infrared (IR) radiation. The reflection band of the UCSF further shifts towards shorter wavelengths with an increase in the angle of incidence. As shown in FIG. 1, the first functional substrate 110 has a thickness "T1". In some cases, "T1" may lie in a range from about 47 μm to about 57 μm. Furthermore, in some cases, "T1" may be about 2 mil or about 50.8 μm. In some other cases, "T1" may be about 1 mil or about 25. 4 μm.

The first louver structure 112 is a microstructure. Microstructures are generally projections, protrusions and/or indentations in the surface of an article that deviate in profile from an average center line drawn through the microstructure. The first louver structure 112 includes a plurality of first louvers 114 (only one shown in FIG. 1) that extend along a first direction "D1" that is substantially perpendicular to the normal axis "N" of the LCF 100. The first louvers are further spaced apart from each other along a second direction "D2" that is substantially perpendicular to the plane of the paper. Specifically, the first louver structure 112 is oriented along the second direction "D2". In some embodiments, each of the plurality of first louvers 114 has a tapered shape. Further, the tapered shape of each first louver 114 tapers towards the second major surface 104 (i.e., the light output surface) of the LCF 100. In other cases (for example, skiving processes), the shape of each first louver 114 may not taper. More details of the first louver structure 112 will be described later with reference to FIG. 3.

Furthermore, the first louver structure 112, including the plurality of first louvers 114, is formed on the first functional substrate 110 by various methods, such as extrusion, cast-and-cure, coating or some other method. In some cases, the first louver structure 112 is micro-replicated on the first functional substrate 110. An exemplary micro-replication process is described in U.S. Pat. No. 8,503,122 B2 (Liu et al.). A typical micro-replication process includes depositing a polymerizable composition onto a master negative micro-structured molding surface in an amount barely sufficient to fill the cavities of the master. The cavities are then filled by moving a bead of the polymerizable composition between a preformed base or substrate layer (for example, the first functional substrate 110) and the master. The composition is then cured.

The first louvers 114 may be channels or grooves defined between adjacent ribs (not shown in FIG. 1). In some cases, the ribs are made of a polymerizable resin. In some cases, the polymerizable resin may be optically clear having a substantially high transmission in a wavelength range from about 300 nanometers (nm) to about 800 nm. The polymerizable resin may include a combination of a first polymerizable component and a second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition may include a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin.

Further, each of the plurality of first louvers 114 of the first louver structure 112 is at least partially filled with a light absorbing material. The light absorbing material may be a pigment, a dye, a black colorant such as carbon black, or combinations thereof. The light absorbing material may substantially prevent light from being transmitted through the first louvers 114. The first louver structure 112 therefore includes alternating ribs and channels (i.e., the first louvers 114). The ribs form optically clear regions, while the first louvers 114 form light absorbing regions.

The first louver structure 112 has a thickness "T2". "T2" may be equal to a louver height and may lie in a range from about 60 μm to about 80 μm. In some cases, "T2" may be about 80 μm. Further, a first land 116 connects the first louver structure 112 with the first functional substrate 110. As shown in FIG. 1, the first land 116 is disposed between the first louver structure 112 and the first functional substrate 110. The first land 116 may be formed during the micro-replication process. The first land 116 may be a continuous land or a discontinuous land. The first land 116 further has a thickness "T3". In some cases, "T3" may be less than about 20 μm, or less than about 10 μm. In some cases, "T3" may be greater than about 1 μm. The thickness "T3" may be minimized in order to reduce leakage of light and also to reduce a total thickness of the LCF 100.

The second portion 108 includes a second functional substrate 118 and a second louver structure 120 formed on the second functional substrate 118. The second functional substrate 118 is disposed distal to the first functional substrate 110. Further, the second functional substrate 118 defines the second major surface 104 of the LCF 100. The second functional substrate 118 includes at least one of an optically active layer and a barrier layer. In some embodiments, the second functional substrate 118 is a barrier film. In a further embodiment, the second functional substrate 118 is a gas barrier film that at least partly reduces permeation of water vapor and oxygen into the LCF 100. The gas barrier film may include a base polyester layer and a thin barrier coating made of layers of polymers and oxides. The polyester layer may have a thickness of about 50 microns (μm) and the thin barrier coating may have a thickness of less than about 2 μm. As shown in FIG. 1, the second functional substrate 118 has a thickness "T4". In some cases, "T4" may lie in a range from about 47 μm to about 57 μm. Furthermore, in some cases, "T4" may be about 2 mils or about 50.8 μm. The gas barrier film may further have a water vapor transfer rate of less than about 1×10–3 grams per square meter per day at 20° C. In some cases, the gas barrier film may be a FTB3-50 barrier film manufactured by the 3M company.

The second louver structure 120 is a microstructure substantially similar to the first louver structure 112. The second louver structure 120 includes a plurality of second louvers 122 that extend along the second direction "D2". The second louvers 122 are further spaced apart from each other along the first direction "D1". Specifically, the second louver structure 120 is oriented along the first direction "D1". In some embodiments, each of the plurality of second louvers 122 has a tapered shape. Further, the tapered shape of each second louver 122 tapers towards the second major surface 104 (i.e., the light output surface) of the LCF 100. In other cases (for example, skiving processes), the shape of each second louver 122 may not taper. More details of the second louver structure 120 will be described later with reference to FIG. 3.

Furthermore, the second louver structure 120, including the plurality of second louvers 122, is formed on the second functional substrate 118 by various methods, such as extrusion, cast-and-cure, coating or some other method. In some cases, the second louver structure 120 is micro-replicated on the second functional substrate 118. An exemplary micro-replication process is described in U.S. Pat. No. 8,503,122 B2 (Liu et al.).

The second louvers 122 may be channels or grooves defined between adjacent ribs 123. In some cases, the ribs 123 are made of a polymerizable resin. In some cases, the polymerizable resin may be optically clear having a substantially high transmission in a wavelength range from about 300 nanometers (nm) to about 800 nm. The polymerizable resin may include a combination of a first polymerizable component and a second polymerizable component selected from (meth)acrylate monomers, (meth)acrylate oligomers, and mixtures thereof. In some cases, the polymerizable composition may include a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin.

Further, each of the plurality of second louvers 122 of the second louver structure 120 is at least partially filled with a light absorbing material. The light absorbing material may be a pigment, a dye, a black colorant such as carbon black, or combinations thereof. The light absorbing material may substantially prevent light from being transmitted through the second louvers 122. The second louver structure 120 therefore includes alternating ribs 123 and channels (i.e., the second louvers 122). The ribs 123 form optically clear regions, while the second louvers 122 form light absorbing regions.

The second louver structure 120 has a thickness "T5". "T5" may be equal to a louver height and may lie in a range from about 60 μm to about 80 μm. In some cases, "T5" may be about 80 μm. Further, a second land 124 connects the second louver structure 120 with the second functional substrate 118. As shown in FIG. 1, the second land 124 is disposed between the second louver structure 120 and the second functional substrate 118. The second land 124 may be formed during the micro-replication process. The second land 124 may be a continuous land or a discontinuous land. The second land 124 further has a thickness "T6". In some cases, "T6" may be less than about 20 μm, or less than about 10 μm. In some cases, "T6" may be greater than about 1 μm. The thickness "T6" may be minimized in order to reduce leakage of light and also to reduce a total thickness of the LCF 100.

As shown in FIG. 1, the adhesive layer 109 is disposed between the first louver structure 112 and the second louver structure 120. Specifically, the adhesive layer 109 including the OCA is disposed between the first louvers 114 and the second louvers 122. The adhesive layer 109 has a thickness "T7". In some cases, "T7" may be less than about 25 μm, or less than about 10 μm, or less than about 5 μm.

A thickness "T" of the LCF 100 is equal to a sum of the thicknesses of the individual layers and films. Specifically, the thickness "T" is equal to the sum of thicknesses "T1", "T2", "T3", "T4", "T5", "T6" and "T7". In some cases, the thickness "T" of the LCF 100 is about 330 μm.

Figure 2:
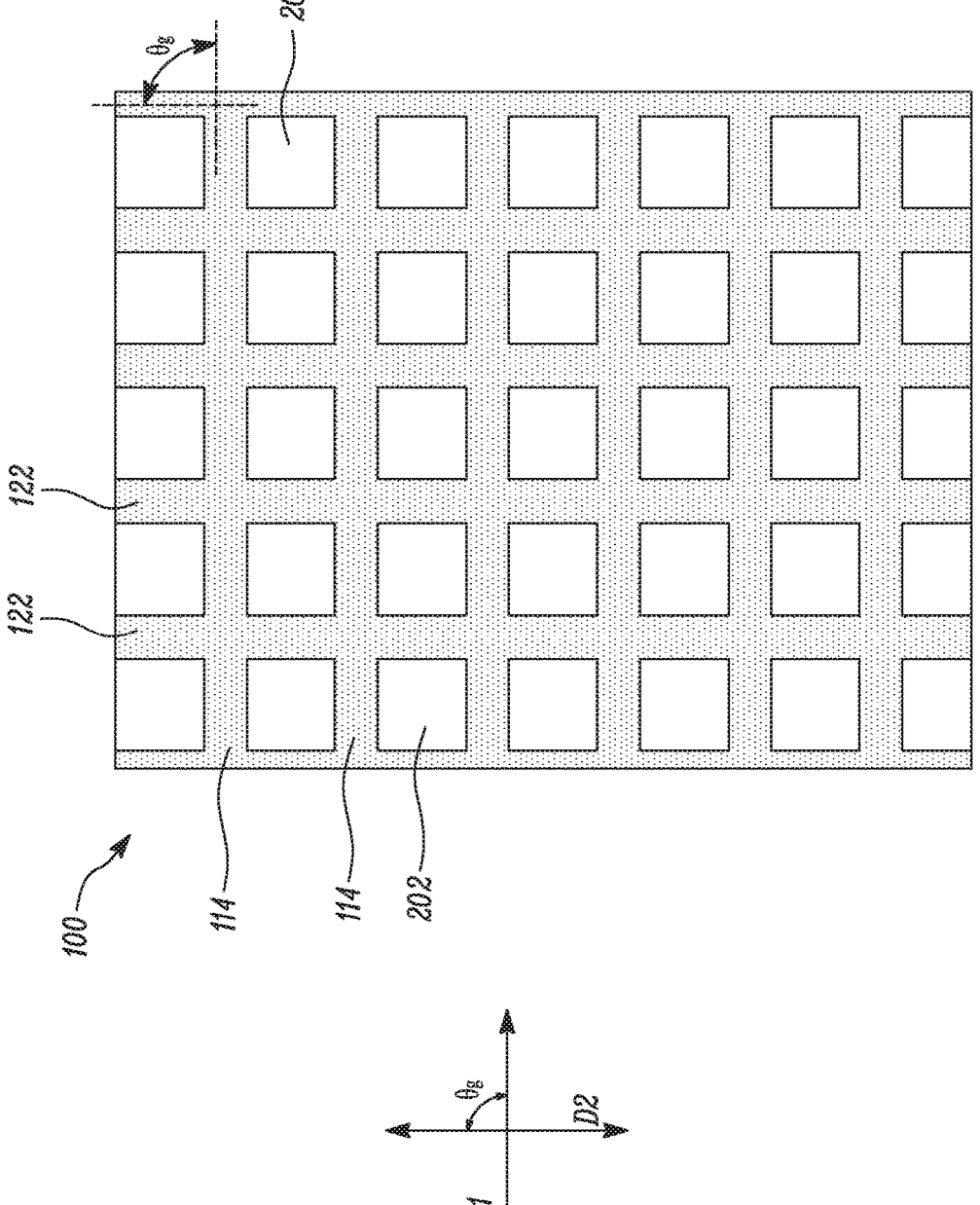
FIG. 2 is a schematic top view of an exemplary light control film.

The adhesive layer 109 is used for laminating the first portion 106 to the second portion 108. The first louver structure 112 of the first portion 106 constitutes a one-dimensional microstructure of alternating ribs and channels. Similarly, the second louver structure 120 of the second portion 108 constitutes another one-dimensional microstructure of alternating ribs and channels. Laminating the first portion 106 and the second portion 108 to each other results in superimposition of the first louver structure 112 over the second louver structure 120 to form a two-dimensional grid, as shown in FIG. 2. The LCF 100 may therefore eliminate the need for specialized tooling that may otherwise be required for forming a co-planar, two-dimensional grid.

FIG. 2 illustrates a schematic top view of the LCF 100. As shown in FIG. 2, the first louver structure 112 and the second louver structure 120 together form the two-dimensional grid including optically clear regions 202. Specifically, the first louvers 114 and the second louvers 122 form an opaque grid with optically clear regions 202. The first louvers 114 extend along the first direction "D1", while the second louvers 122 extend along the second direction "D2". An angle "θg" is defined between the first direction "D1" and the second direction "D2". In the exemplary embodiment, as shown in FIG. 2, the angle "θg" is substantially 90 degrees, i.e., the first louvers 114 and the second louvers 122 are substantially orthogonal to each other. However, in other embodiments, the angle "θg" lies in a range from about 80 degrees to about 100 degrees. In yet other embodiments, the angle "θg" lies in a range from about 70 degrees to about 110 degrees.

The two-dimensional grid pattern formed by the first louver structure 112 and the second louver structure 120 may be tailored to a variety of geometries based on an application of the LCF 100. For example, the two-dimensional grid pattern may be compatible with an underlying pixelated image sensor which results in an improved raw image for subsequent processing.

Referring to FIGS. 1 and 2, the two-dimensional grid formed by the first and second louver structures 112, 120 may determine a viewing angle "Ov" of the LCF 100. The first and second louver structures 112, 120 may therefore provide angular selectivity to the LCF 100. Specifically, the first and second louver structures 112, 120 may act as an angular filter of the LCF 100. The viewing angle "Ov" is defined with respect to an axis that is normal to the plane of the LCF 100. The normal axis "N" is the axis that is normal to the plane of the LCF 100. The viewing angle "θv" is centered on the normal axis "N". In some other cases, the viewing angle "θv" may not be centered at the normal axis "N" of the plane of the LCF 100, and may instead be off-center with respect to the normal axis "N". In some cases, the viewing angle "θv" is centered on an axis of peak transmission of the LCF 100. In some cases, the axis of peak transmission of the LCF 100 may the normal axis "N". In some other cases, the axis of peak transmission of the LCF 100 may be another axis that is oblique to the plane of the LCF 100. Incident light that is substantially parallel to the axis of peak transmission undergoes peak transmission through the LCF 100.

Furthermore, an incidence angle "θi" of a light ray "B" is defined with respect to a normal to the LCF 100. As described herein, the normal to the LCF 100 is substantially perpendicular to the plane of the LCF 100, discounting any local variation in the smoothness of the LCF 100 where the variation may, for example, be general surface roughness or a regular microstructure formed in the LCF 100. A light ray incident parallel to the normal has an incidence angle of zero. Therefore, "normal incidence angle" or "normal incidence" may mean incident perpendicularly to the LCF 100, discounting any local variation in the LCF 100. The normal to the LCF 100 is also defined by the normal axis "N".

In some embodiments, the viewing angle "θv" of the LCF 100 is less than about 40 degrees centered on the normal axis "N" that is normal to the plane of the LCF 100. In some other embodiments, the viewing angle "θv" of the LCF 100 is less than about 20 degrees centered on the normal axis "N". In some cases, the viewing angle "θv" of the LCF 100 is less than about 40 degrees centered on the axis of peak transmission of the LCF 100. A transmission of the LCF 100 at an incidence angle greater than half of the viewing angle "θv" is substantially zero. In some cases, at an incidence angle greater than about 15 degrees, the transmission of the LCF 100 is substantially zero. In some cases, at an incidence angle greater than about 20 degrees, the transmission of the LCF 100 is substantially zero. In some other cases, at an incidence angle greater than about 9 degrees, or greater than about 10 degrees, the transmission of the LCF 100 is substantially zero. In some cases, substantially zero transmission may correspond to less than about 50% of peak transmission at normal incidence angle. In some other cases, substantially zero transmission may correspond to total blockage of light, i.e., 0% of peak transmission. For example, the light ray "B" having the incidence angle "θi" less than half of the viewing angle "θv" may be transmitted by the LCF 100 at a particular transmittance. The transmittance may depend on the incidence angle "θi". However, a light ray "C" having an incidence angle "θj" greater than half of the viewing angle "θv" may be substantially blocked by the LCF 100. A field of view ("FOV") of the LCF 100 may be substantially equal to the viewing angle "θv". In some cases, the "FOV" of the LCF 100 is less than about 40 degrees, or less than about 20 degrees.

The LCF 100 is further spectrally selective to incident light. The first functional substrate 110 (i.e., the MOF) may provide spectral selectivity to the LCF 100. In an embodiment, the LCF 100 has a transmission at normal incidence greater than about 40% throughout all of a wavelength range from about 400 nm to about 700 nm. In another embodiment, the LCF 100 has a transmission at normal incidence greater than about 20% throughout all of a wavelength range from about 400 nm to about 700 nm. In yet another embodiment, the LCF 100 has a transmission at normal incidence greater than about 5% throughout all of a wavelength range from about 400 nm to about 700 nm. In some cases, the LCF 100 may further block wavelengths greater than about 800 nm. The transmission of the LCF 100 may correspond to an average optical transmittance of the LCF 100. In some embodiments, the rejected or blocked wavelengths may progressively shift to shorter wavelengths with increasing angles of incidence. Therefore, the blocking functionality of the LCF 100 may shift towards shorter wavelengths with an increase in the angle of incidence. Furthermore, the LCF 100 may reduce permeation of water vapor and oxygen gas. The reduced permeation may be provided by the second functional substrate 118 (i.e., the barrier film). The reduced permeation of water vapor and oxygen may increase a life of components (for example, digital image sensors) disposed beneath the LCF 100. The LCF 100 may therefore be a multi-functional optical film that provides spectrally selective, angularly selective and barrier functionalities.

The LCF 100 further has a reduced thickness because the first and second louver structures 114, 120 are formed directly on the first and second functional substrates 110, 118, respectively. This may eliminate the need for separate substrates (for example, PET substrates) and additional adhesive layers to attach the substrates to adjacent layers. In some cases, the LCF 100 may have a reduction in thickness of at least 145 μm as compared to a conventional LCF. Therefore, the LCF 100 may be suitable for certain imaging applications where the thickness is an important parameter. Examples of such applications include mobile electronic devices, such as mobile phones.

Figure 3:
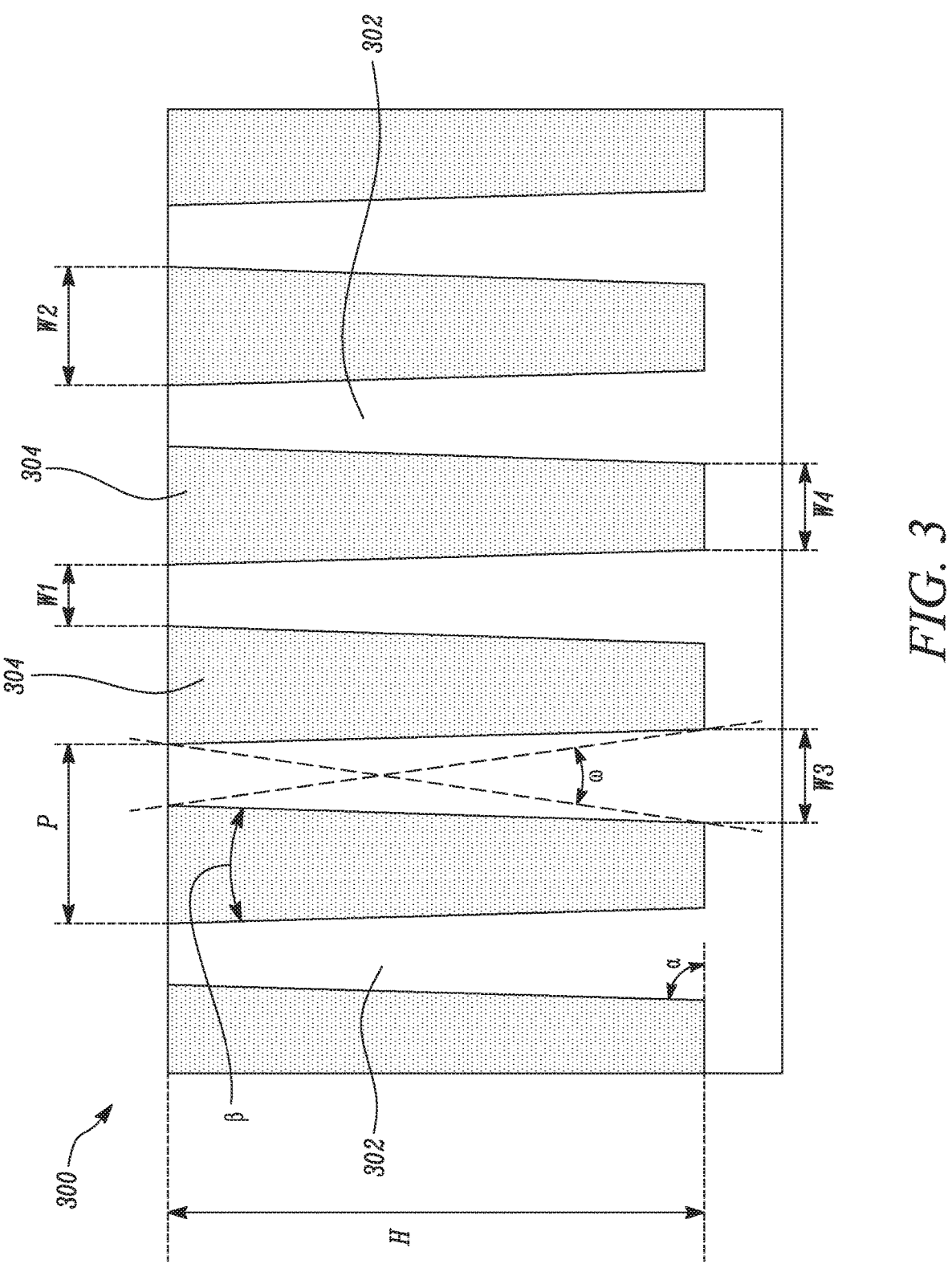
FIG. 3 is a schematic cross-sectional view of an exemplary louver structure used in a light control film.

FIG. 3 illustrates a schematic cross-sectional view of an exemplary louver structure 300 used in the LCF 100 (shown in FIGS. 1 and 2). The louver structure 300 may correspond to the first louver structure 112 and/or the second louver structure 120. The louver structure 300 may be a microstructure that is formed on a substrate, for example, the first functional substrate 110 or the second functional substrate 118. The louver structure 300 includes a plurality of alternating ribs 302 and channels 304. The channels 304 are grooves defined between adjacent ribs 302. The channels 304 may correspond to the first louvers 114 and/or the second louvers 122. The channels 304 may be at least partially filled with a light absorbing material. The channels 304 therefore form light absorbing regions of the louver structure 300. The ribs 302 may be made of a polymerizable resin. The ribs 302 may therefore form light transmitting regions of the louver structure 300. As shown in FIG. 3, each of the ribs 302 and each of the channels 304 has a tapered shape. The direction of taper of each rib 302 is opposite to a direction of taper of each channel 304. In some other cases (for example, skiving processes), the shape of each rib 302 and the shape of each channel 304 may not taper.

The louver structure 300 has a height "H" and a pitch "P". The height "H" may correspond a height of each rib 302 and a height of each channel 304. The pitch "P" indicates spacing between adjacent ribs 302 as well as adjacent channels 304. Each rib 302 has a rib width "W1". Further, each channel 304 has a channel width "W2". The pitch "P" is substantially equal to a sum of the rib width "W1" and the channel width "W2". Each rib 302 further has a base rib width "W3". The rib width "W1" is lesser than the base rib width "W3" due to the taper of each rib 302. Each channel 304 also has a base channel width "W4". The channel width "W2" is greater than the base channel width "W4" due to the taper of each channel 304. In some cases, the base rib width "W3" may be substantially equal to the base channel width "W4".

In some cases, the height "H" lies in a range from about 60 μm to about 80 μm. In some other cases, the height "H" may be equal to about 60 μm, or 70 μm, or 80 μm. In some cases, the pitch "P" may be equal to about 20 μm. The rib width "W1" may decrease with a decrease in the height "H", and vice versa. Further, the rib width "W1" may lie in a range from about 5 μm to about 7 μm. In some cases, the rib width "W1" may be equal to about 6.86 μm, or 6.33 μm, or 5.81 μm. In some cases, each of the base rib width "W3" and the base channel width "W4" may be equal to about 10 μm. An aspect ratio "R" of the louver structure 300 may be a ratio between the height "H" and the base rib width "W3", i.e., "H/W3". The aspect ratio "R" of the louver structure 300 may be greater than 1. In some cases, the aspect ratio "R" may lie in a range from about 6 to about 8. In some cases, the aspect ratio "R" may be equal to about 6, or 7, or 8.

The louver structure 300 further has a wall angle "a" and an interface angle "B". The wall angle "α" defines the taper of each rib 302. In some cases, the wall angle "α" may be about 91.5 degrees. In some other cases, the wall angle "α" may be greater than about 90.3 degrees. In some cases, the louver structure 300 may have substantially zero taper, i.e., the wall angle "α" may be about 90 degrees. Further, the interface angle "β" is defined between adjacent ribs 302. In some cases, the interface angle "β" is equal to about 3 degrees. The louver structure 300 further has a viewing cutoff angle "ω". The viewing cutoff angle "ω" is defined by the geometry of the ribs 302 and the channels 304.

The LCF 100 and the louver structure 300 may be used in various optical applications, such as imaging applications, displays, and so forth. In some cases, the LCF 100 and the louver structure 300 may be used in optical devices.

Figure 4:
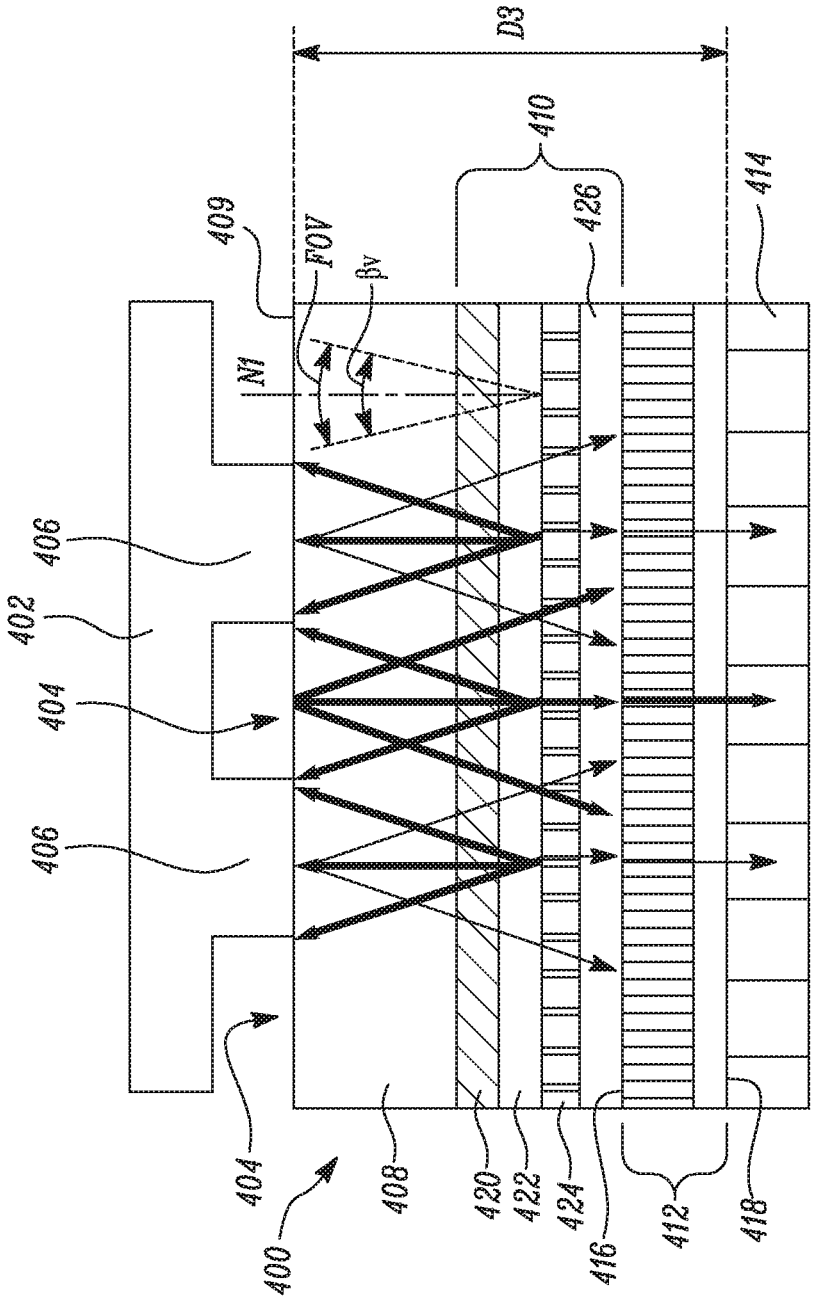
FIG. 4 is a schematic cross-sectional view of an exemplary optical device using a light control film.

FIG. 4 illustrates a schematic cross-sectional view of an exemplary optical device 400. In some cases, the optical device 400 may be a mobile electronic device, such as a mobile phone, a camera, a tablet, a wearable device, and so forth. In some other cases, the optical device 400 may include any device used for optical sensing or imaging of an object. Such sensing devices may be used in various applications, for example, consumer electronics, health monitoring, medical diagnostics, and automotive and security applications.

In the exemplary embodiment shown in FIG. 4, the optical device 400 is a mobile hand-held device. An object 402, that is being sensed or imaged by the optical device 400, is a fingerprint with alternating valleys 404 and ridges 406. In an example, the optical device 400 is a mobile phone which has fingerprint recognition functionality. The optical device 400 includes a cover lens 408, a display layer 410 disposed adjacent to the cover lens 408, a light control film (LCF) 412 disposed adjacent to the display layer 410, and an optical sensor 414 disposed adjacent to the LCF 412 and disposed distal to the display layer 410. The cover lens 408 is disposed distal to the LCF 412. The object 402 lies on the cover lens 408. The LCF 412 has a light input surface 416 and a light output surface 418. In the exemplary embodiment, as shown in FIG. 4, the light input surface 416 is disposed adjacent to the display layer 410, while the light output surface 418 is disposed adjacent to the optical sensor 414. As shown in FIG. 4, the optical sensor 414 is located at a distance "D3" from a top surface 409 of the cover lens 408. An imaging plane of the optical sensor 414 may be located at the top surface 409 of the cover lens 408. The distance "D3" may correspond to a distance between the imaging plane and the sensing plane of the optical device 400. In some cases, the distance "D3" may be less than about 2 millimeters (mm). In some other cases, the distance "D3" may be less than about 1.5 mm.

The LCF 412 is substantially similar to the LCF 100, described above in conjunction with FIGS. 1 and 2. Internal components of the LCF 412 has been omitted in FIG. 4 for the purpose of illustration. Similar to the LCF 100, the LCF 412 includes a first portion laminated to a second portion by a layer of an optically clear adhesive (OCA). The first portion includes a first functional substrate and a first louver structure formed on the first functional substrate. The first functional substrate defines the light input surface 416 and is located adjacent to the display layer 410. The first functional substrate includes at least one of an optically active layer and a barrier layer. In some cases, the first functional substrate is a multilayer optical film (MOF). The first louver structure includes a plurality of first louvers. Each of the plurality of first louvers is at least partially filled with a light absorbing material. Further, each of the plurality of first louvers has a tapered shape that tapers towards the optical sensor 414.

The second portion of the LCF 412 includes a second functional substrate and a second louver structure formed on the second functional substrate. The second functional substrate includes at least one of an optically active layer and a barrier layer. The second functional substrate defines the light output surface 418 and is located adjacent to the optical sensor 414. In some cases, the second functional substrate is a barrier film. The second louver structure includes a plurality of second louvers. Each of the plurality of second louvers is at least partially filled with a light absorbing material. Further, each of the plurality of second louvers has a tapered shape that tapers towards the optical sensor 414.

The first louvers of the LCF 412 extend along a first direction and the second louvers of the LCF 412 extend long a second direction. The first direction and the second direction are inclined to each other at an angle that lies within a range from about 70 degrees to about 110 degrees. The layer of OCA is further disposed between the first louvers and the second louvers. The first louvers and the second louvers together form a two-dimensional grid pattern with optically clear regions.

In some cases, the LCF 412 has a viewing angle "βv" of less than about 40 degrees centered on a normal axis "N1" that is normal to a plane of the LCF 412. In some other embodiments, the viewing angle "βv" of the LCF 412 is less than about 20 degrees centered on the normal axis "N1". In some cases, the viewing angle "βv" of the LCF 412 is less than about 40 degrees centered on an axis of peak transmission of the LCF 412. In some cases, the axis of peak transmission of the LCF 412 may the normal axis "N1". In some other cases, the axis of peak transmission of the LCF 412 may be another axis that is oblique to the plane of the LCF 412. Incident light that is substantially parallel to the axis of peak transmission undergoes peak transmission through the LCF 412.

A transmission of the LCF 412 at an incidence angle greater than half of the viewing angle "βv" is substantially zero. In some cases, at an incidence angle greater than about 15 degrees, the transmission of the LCF 412 is substantially zero. In some cases, at an incidence angle greater than about 20 degrees, the transmission of the LCF 412 is substantially zero. In some other cases, at an incidence angle greater than about 9 degrees, or greater than about 10 degrees, the transmission of the LCF 412 is substantially zero. In some cases, substantially zero transmission may correspond to less than about 50% of peak transmission at normal incidence angle. In some other cases, substantially zero transmission may correspond to total blockage of light, i.e., 0% of peak transmission. A field of view ("FOV") of the LCF 412 may be substantially equal to the viewing angle "βv". In some cases, the "FOV" of the LCF 412 is less than about 40 degrees, or less than about 20 degrees.

In an embodiment, the LCF 412 has a transmission at normal incidence greater than about 5%, or greater than about 10%, or greater than about 20%, or greater than about 40% throughout all of a wavelength range from about 400 nm to about 700 nm. In some cases, the LCF 412 may further block wavelengths greater than about 800 nm. The transmission of the LCF 412 may correspond to an average optical transmittance of the LCF 412. In some embodiments, the rejected or blocked wavelengths may progressively shift to shorter wavelengths with increasing angles of incidence. Therefore, the blocking functionality of the LCF 412 may shift towards shorter wavelengths with an increase in the angle of incidence. Furthermore, the LCF 412 may reduce permeation of water vapor and oxygen gas to increase a life of the optical sensor 414 disposed beneath the LCF 412. The LCF 412 may also have a reduced thickness similar to the LCF 100. Therefore, the LCF 412 may be suitable for the optical device 400 that requires a thin construction. In some cases, the LCF 412 may reduce a thickness of the optical device 400 by at least 145 μm.

The cover lens 408 is substantially transparent and is made of a suitable material, such as glass or plastic. The cover lens 408 covers the display layer 410. In some cases, the cover lens 408 may be bonded to the display layer 410 by a layer of OCA. In an embodiment, the display layer 410 may be an organic light emitting diode (OLED) screen with a touch panel. The display layer 410 includes a polarizer 420, a touch sensitive layer 422, an OLED layer 424, and a polyimide (PI) film 426. In some cases, the polarizer 420 may be a circular polarizer. Further, the touch sensitive layer 422 may be a capacitive touch panel. OLED layer 424 includes an OLED array. The PI film 426 may act as a substrate for the OLED layer 424. The PI film 426 may be bonded to the LCF 412 by a layer of OCA. The display layer 410, as shown in FIG. 4, is exemplary in nature, and the optical device 400 may include other type of display within the scope of the present disclosure.

The LCF 412 is disposed between the display layer 410 and the optical sensor 414. The LCF 412 may be bonded to the optical sensor 414 by a layer of OCA. The LCF 412 may act as a spectrally selective and angularly selective optical film for the optical sensor 414. Further, the LCF 412 may also act as a barrier film that reduces permeation of water vapor and oxygen to the optical sensor 414.

In some cases, the optical sensor 414 is a pixelated image sensor including an array of pixels. In some cases, the optical sensor 414 may be an active-pixel sensor (APS) using complementary metal-oxide-semiconductor (CMOS) technology. In some cases, the optical sensor 414 may further incorporate organic photo detector (OPD) materials. The two-dimensional grid pattern, that is formed by the first louvers and the second louvers of the LCF 412, may be tailored to a variety of geometries compatible with the optical sensor 414. This may result in an improved raw image of the object 402 for subsequent processing. Further, the optically clear parts of the two-dimensional grid pattern may be easily aligned with patterned optical detection pixels of the optical sensor 414 without registration.

Light required for imaging or sensing the object 402 may be emitted by the display layer 410. Light emitted by the display layer 410 is reflected from the object 402 (i.e., the fingerprint). The valleys 404 typically reflects more light than the ridges 406. The LCF 412 allows light with only small angles of incidence to be transmitted to the optical sensor 414. The resulting image may be sharp with the valleys 404 appearing clear and the ridges 406 appearing dark. The image of the fingerprint may then be processed by suitable circuitry (not shown) associated with the optical device 400. The circuitry may employ an imaging algorithm to determine various features of the fingerprint. The optical device 400 therefore uses an OLED display for sensing fingerprints. Further, the LCF 412 provides angular and spectral control of light reaching the optical sensor 414 for improved imaging of fingerprints.

For certain imaging applications, it may be desirable to only used a specific range of wavelengths and reject other wavelengths lying outside the range. For example, the OPD materials associated with the optical sensor 414 may have a specific spectral response. In some cases, the OPD materials may only use electromagnetic wavelengths from about 400 nm to about 650 nm and rejects wavelengths above 650 nm. The LCF 412 utilizing the MOF (i.e., the first functional substrate) acts as a spectral filter to allow the specific range of wavelengths detected by the OPD materials to reach the optical sensor 414. A transmission and/or a reflection of the MOF may change with a wavelength of incident radiation. In some cases, the MOF is an Ultra-Clear Solar Film (UCSF) manufactured by 3M Company. The UCSF is a multilayer optical film that reflects infrared (IR) radiation.

Figure 5:
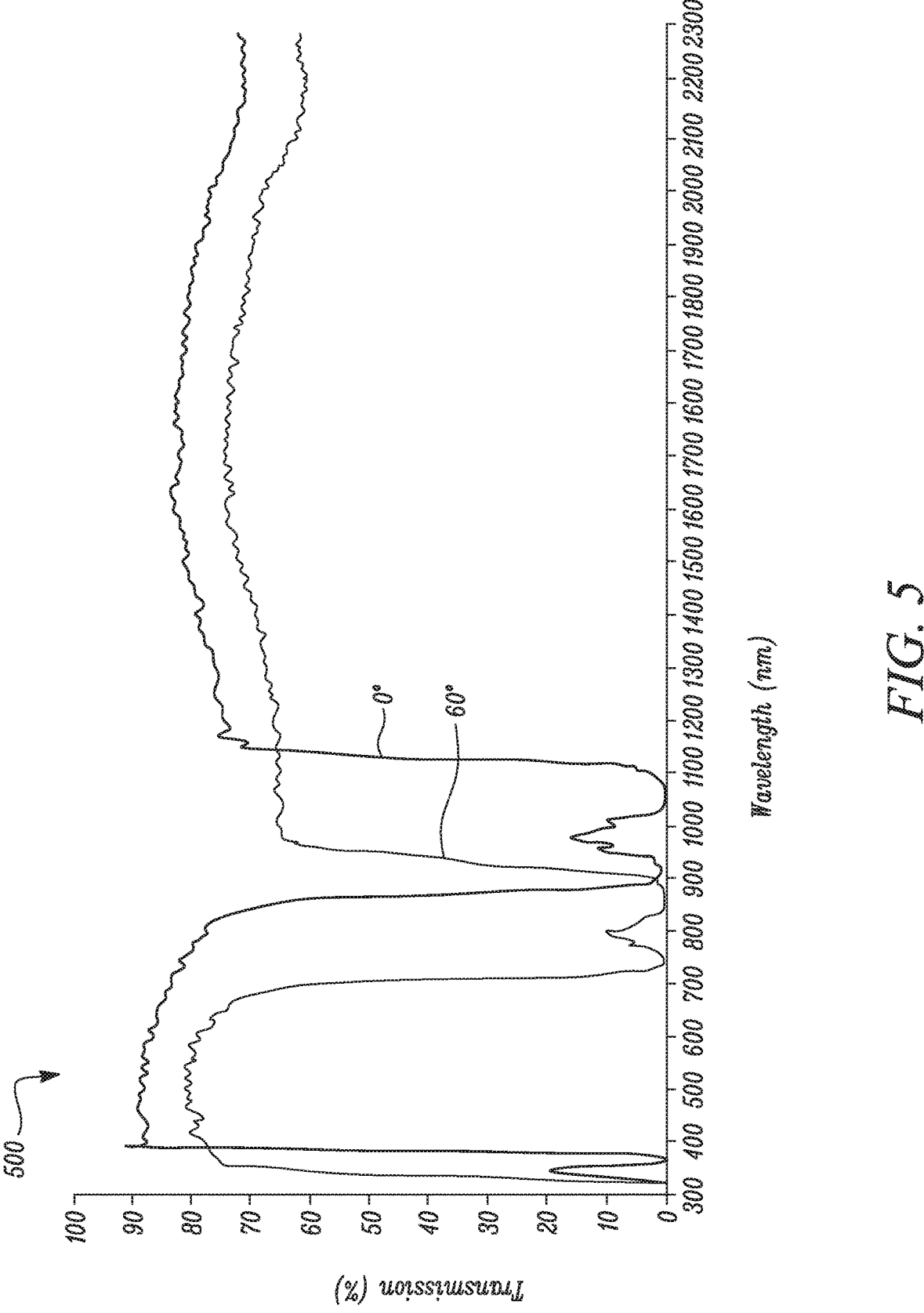
FIG. 5 is a schematic plot of transmission of an optical film vs. wavelength.

FIG. 5 illustrates a plot 500 that schematically shows the relation between transmission of the UCSF and wavelength of incident light for different incidence angles. It is apparent from the plot 500 that blocking functionality (reflection band) of the UCSF shifts towards shorter wavelengths with an increase in the angle of incidence. For example, at normal incidence (incidence angle of 0 degree), the blocking function of the UCSF occurs at about 900 nm. However, the blocking function occurs at about 700 nm for an incidence angle of about 60 degrees. The UCSF may therefore be suitable for imaging applications using OPD materials.

FIG. 6 schematically shows an exemplary method 600 of manufacturing a light control film (LCF) of the present disclosure. The LCF may the LCF 100 (shown in FIGS. 1 and 2) or the LCF 412 (shown in FIG. 4). The method 600 will be described with reference to the LCF 100. At step 602, the method 600 includes forming the plurality of first louvers 114 on the first functional substrate 110 to provide the first portion 106 of the LCF 100. The first functional substrate 110 includes at least one of an optically active layer and a barrier layer. The plurality of first louvers 114 is formed on the first functional substrate 110 by various methods, such as extrusion, cast-and-cure, coating or some other method. In some cases, the first louver structure 112, including the first louvers 114, is micro-replicated on the first functional substrate 110. In some cases, micro-replication may be performed by a continuous cast and cure (3C) process. An exemplary micro-replication process is described in U.S. Pat. No. 8,503,122 B2 (Liu et al.). A typical micro-replication process includes the following steps: (a) preparing a polymerizable composition; (b) depositing or coating a layer of the polymerizable composition onto a moving web substrate (for example, the first functional substrate); (c) contacting the layer of the polymerizable composition on the moving web substrate with a master negative microstructured molding surface to fill the cavities of the master; and (d) curing the composition with ultraviolet (UV) radiation. The deposition temperature can range from room temperature to about 82° C. The microstructured molding surface of the master is the opposite (i.e., negative) of the structure being formed. The master can be metallic, such as nickel, chrome- or nickel-plated copper or brass, or can be a thermoplastic material that is stable under the polymerization conditions, and has a surface energy that allows clean removal of the polymerized material from the master. One or more of the surfaces of the substrate layer may optionally be primed or otherwise be treated to promote adhesion of the optical layer to the substrate layer. For example, the first functional substrate 110 may be treated to promote adhesion of the first louver structure 112 to the first functional substrate 110.

At step 604, the method 600 further includes at least partially filling the plurality of first louvers 114 with a light absorbing material. The light absorbing material may be a pigment, a dye, a black colorant such as carbon black, or combinations thereof. The light absorbing material may substantially prevent light from being transmitted through the first louvers 114.

At step 606, the method 600 further includes forming the plurality of second louvers 122 on the second functional substrate 118 to provide the second portion 108 of the LCF 100. The second functional substrate 118 includes at least one of an optically active layer and a barrier layer. The plurality of second louvers 122 is formed on the second functional substrate 118 by various methods, such as extrusion, cast-and-cure, coating or some other method. In some cases, the second louver structure 120, including the second louvers 122, is micro-replicated on the second functional substrate 118. In some cases, micro-replication may be performed by a continuous cast and cure (3C) process. An exemplary micro-replication process is described in U.S. Pat. No. 8,503,122 B2 (Liu et al.). A typical micro-replication process includes the following steps: (a) preparing a polymerizable composition; (b) depositing or coating a layer of the polymerizable composition onto a moving web substrate (for example, the second functional substrate); (c) contacting the layer of the polymerizable composition on the moving web substrate with a master negative microstructured molding surface to fill the cavities of the master; and (d) curing the composition with ultraviolet (UV) radiation. The deposition temperature can range from room temperature to about 82° C. The microstructured molding surface of the master is the opposite (i.e., negative) of the structure being formed. The master can be metallic, such as nickel, chrome- or nickel-plated copper or brass, or can be a thermoplastic material that is stable under the polymerization conditions, and has a surface energy that allows clean removal of the polymerized material from the master. One or more of the surfaces of the substrate layer may optionally be primed or otherwise be treated to promote adhesion of the optical layer to the substrate layer. For example, the second functional substrate 118 may be treated to promote adhesion of the second louver structure 120 to the second functional substrate 118.

At step 608, the method 600 further includes at least partially filling the plurality of second louvers 122 with a light absorbing material. The light absorbing material may be a pigment, a dye, a black colorant such as carbon black, or combinations thereof. The light absorbing material may substantially prevent light from being transmitted through the second louvers 122.

At step 610, the method 600 further includes laminating the first portion 106 and the second portion 108 to each other such that the second functional substrate 118 is disposed distal to the first functional substrate 110. Each of the plurality of first louvers 114 extends along the first direction "D1" and each of the plurality of second louvers 122 extends along the second direction "D2". Further, the first direction "D1" and the second direction "D2" are inclined to each other at the angle "Og" that lies in a range from about 70 degrees to about 110 degrees.

In some embodiments, laminating the first portion 106 and the second portion 108 to each other further includes bonding the first portion 106 to the second portion 108 by an optically clear adhesive (OCA). The OCA may be an ultraviolet (UV) curable acrylate adhesive, a transfer adhesive, and the like. Exemplary laminating methods are described in U.S. Pat. No. 6,398,370 B1 (Chiu et al.). In some cases, the first portion 106 and the second portion 108 may be laminated to each other by some other method, for example, hot lamination.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A light control film comprising:
   a first portion including:
      a first functional substrate, wherein the first functional substrate includes at least one of an optically active layer and a barrier layer; and
      a first louver structure micro-replicated directly on the first functional substrate, the first louver comprising a plurality of first louvers defined by grooves in an optically clear cured resin between alternating ribs, wherein each of the plurality of first louvers is at least partially filled with a light absorbing material; and a second portion laminated to the first portion, the second portion including:

a second functional substrate disposed distal to the first functional substrate, wherein the second functional substrate includes at least one of an optically active layer and a barrier layer; and a second louver structure micro-replicated directly on the second functional substrate, the second louver structure comprising a plurality of second louvers defined by grooves in an optically clear cured resin between alternating ribs, wherein each of the plurality of second louvers is at least partially filled with the light absorbing material;

wherein the plurality of first louvers extend along a first direction and the plurality of second louvers extend along a second direction, and wherein the first direction and the second direction are inclined to each other at an angle that lies within a range from about 70 degrees to about 110 degrees, and wherein the plurality of first louvers and the plurality of second louvers are disposed between the first functional substrate and the second functional substrate and laminated to each other directly by an adhesive layer.

2. The light control film of claim 1, wherein the light control film has a viewing angle of less than about 40 degrees centered on an axis of peak transmission of the light control film, and wherein the transmission of the light control film at an incidence angle greater than half of the viewing angle is substantially zero.

3. The light control film of claim 1, wherein the light control film has a transmission at normal incidence greater than about 5% throughout all of a wavelength range from about 400 nm to about 700 nm.

4. The light control film of claim 1, wherein the first functional substrate is a multilayer optical film.

5. The light control film of claim 1, wherein the second functional substrate is a gas barrier film.

6. The light control film of claim 1, wherein the first portion and the second portion are laminated to each other by a layer of an optically clear adhesive (OCA) disposed between the plurality of first louvers and the plurality of second louvers.

7. The light control film of claim 1, wherein each of the plurality of first louvers has a tapered shape.

8. The light control film of claim 1, wherein each of the plurality of second louvers has a tapered shape.

9. The light control film of claim 1, further comprising first land formed during micro-replication that directly connects the first louver structure to the first functional substrate.

10. The light control film of claim 1, further comprising a second land formed during micro-replication that directly connects the second louver structure to the second functional substrate.

11. An optical device using the light control film of claim 1, comprising a cover lens and a display layer disposed adjacent to the cover lens, wherein the light control film is disposed adjacent to the display layer.

* * * * *